United States Patent

Zarcone et al.

[15] 3,639,842

[45] Feb. 1, 1972

[54] DATA TRANSMISSION SYSTEM FOR DIRECTLY GENERATING VESTIGIAL SIDEBAND SIGNALS

[72] Inventors: Carl J. Zarcone; Bruce M. Cleveland; Donald F. Smith, all of Monroe, N.Y.

[73] Assignee: General Dynamics Corporation

[22] Filed: Oct. 17, 1968

[21] Appl. No.: 768,426

[52] U.S. Cl. ................................328/61, 307/221, 325/136, 325/137, 328/38, 328/104

[51] Int. Cl. ........................................................H03k 5/13

[58] Field of Search ....................307/221, 269, 294; 328/37, 328/38, 61, 63, 104, 106, 122, 130; 325/136, 137

[56] References Cited

UNITED STATES PATENTS

| | | | |
|---|---|---|---|
| 3,292,110 | 12/1966 | Becker et al. | 333/18 |
| 3,297,951 | 1/1967 | Badsbalg | 328/37 |
| 3,371,342 | 2/1968 | Carré | 328/163 X |
| 3,474,260 | 10/1969 | Frohbach | 307/221 |
| 3,500,215 | 3/1970 | Leuthold et al | 328/61 |
| 3,359,496 | 12/1967 | Burnsweig, Jr. et al | 325/137 |
| 3,478,170 | 11/1969 | Hanni | 325/38 X |
| 3,484,556 | 12/1969 | Flanagan et al | 179/15.55 |
| 3,521,170 | 7/1970 | Leuthold et al | 325/42 X |

*Primary Examiner*—Donald D. Forrer
*Assistant Examiner*—R. C. Woodbridge
*Attorney*—Martin Lu Kacher

[57] ABSTRACT

A system and technique for generating vestigial sideband signals capable of carrying digital information at high-bit rates is described. The bits are circulated through one or more delay lines and weighted samples are taken at a rate higher than the highest frequency of the sideband to be transmitted. The samples may be summed, directly or in weighted relationship when a multilevel signal is desired, to provide an output signal. This output signal is filtered to remove those frequencies which lie above the band which is to be transmitted through the channel and thereupon applied to the channel. By apportioning the weight of each sample in accordance with the spectral characteristics of the channel, the output signal will be readily accommodated by the channel and be transmitted therethrough with least distortion.

5 Claims, 5 Drawing Figures

INVENTORS.
CARL J. ZARCONE
BRUCE M. CLEVELAND
DONALD F. SMITH

INVENTORS.
CARL J. ZARCONE
BRUCE M. CLEVELAND
DONALD F. SMITH

INVENTORS.
CARL J. ZARCONE
BRUCE M. CLEVELAND
DONALD F. SMITH

DATA TRANSMISSION SYSTEM FOR DIRECTLY GENERATING VESTIGIAL SIDEBAND SIGNALS

The present invention relates to data transmission systems, and particularly to a system for processing data for transmission over a channel in the form of a vestigial sideband signal.

The invention is especially suitable for use in the transmission of digital data over telephone voice communication lines. In such application, the invention may be used in a modem which translates digital data as may arrive from a computer or other data terminal apparatus into a signal having characteristics which are compatible with the line characteristics. The invention, however, is of general application in signal processing, both for frequency translation and spectral shaping or filtering purposes.

The transmission of high-speed data over telephone voice circuits poses more severe problems than does the transmission of speech. Data transmission requirements covering such characteristics of the signal as bandwidth, frequency response, delay distortion and phase distortion become increasingly severe as the data transmission rate increases. Telephone channels generally have a bandwidth of from about 300 Hz. to 3,000 Hz. The most distortion free portion of the channel lies between about 1,200 to 2,400 Hz. The data spectrum is desirably located within this portion of the channel. In conventional data transmitters, this is accomplished by passing the data first through a low pass filter having an extremely steep cutoff characteristic above 1,200 Hz. The filter output is then modulated to translate the data spectrum so that its lower sideband lies approximately between 1,200 and 2,400 Hz. A vestigial sideband filter at the output of the modulator removes the carrier and the high frequency sideband. This filter must also have an extremely sharp low frequency cutoff. Such sharp cutoff characteristics are obtained at the sacrifice of phase linearity. Thus, the filtering process introduces considerable phase distortion in the signal, thereby requiring a telephone channel having a more linear phase characteristic than may be available. Signal equalizers are also necessary in order to compensate for the phase distortion which is introduced by the filtering process. Of course, the higher the data transmission rate, the more difficult is the signal equalization which is necessary in order to compensate for the distortion.

It is a feature of this invention to provide an improved signalling technique and system which produces a signal output having low distortion and which does away with the need for the low pass filter, modulator and vestigial sideband filter of the conventional system.

It is another feature of the signalling system provided by the invention to effectively process an incoming signal, such as a stream of data bits, translated in frequency so that it lies in a band compatible with the transmission characteristics of the channel without introducing phase distortion; in other words, to provide a linear signal processing filter.

Thus, it is a principal object of the invention to provide an improved information transmission system, especially suitable for transmitting digital data, at high transmission rate with low error rate.

It is a further object of the present invention to provide a method and system for transmitting digital data which itself operates digitally and may be constructed out of integrated circuits for high reliability.

It is a still further object of the present invention to provide an improved digital signal-processing filter which utilizes few critical circuit elements, such as inductors and capacitors.

Briefly described, a data transmission system embodying the invention includes a sample data filter which both translates the frequency spectrum of the data input so that it lies within the desired bandwidth of the transmission channel, say 1.2 to 2.4 kHz., and filters that spectrum so that its spectral characteristic is compatible with the spectral characteristics of the channel. The system may include a low pass filter at the output of the sample data filter which band limits the output signal, say to 1.2 to 2.4 kHz.

The sample data filter itself includes means such as a data storage means through which the bits of the data are passed at a rate higher than the symbol rate (viz the rate at which symbols each representing a bit or a plurality of bits are transmitted through the channel). Samples of the bits of the message are taken, each sample being weighted in accordance with the spectral characteristic of the output signal which is desired. Preferably, this spectral characteristic matches that of the channel. These weighted samples are summed to produce the output signal. Inasmuch as the samples are taken at a relatively high rate, the spectrum of the output signal contains components which are modulation products of the input signal and the sampling signal. These modulation products may readily be removed by a noncritical low pass filter so as to band limit the output signal so that it lies within the desired low distortion portion of the channel response characteristic.

If desired, a multilevel output signal may be produced, each level corresponding to a plurality of the data input bits which are to be transmitted. The latter may be accomplished by weighting the outputs of the sample data filter in accordance with a code corresponding to the value of the bits to be transmitted.

The invention itself, both as to its organization and method of operation, as well as additional objects and advantages thereof will become more readily apparent from a reading of the following description in connection with the accompanying drawings in which.

Figure 1:
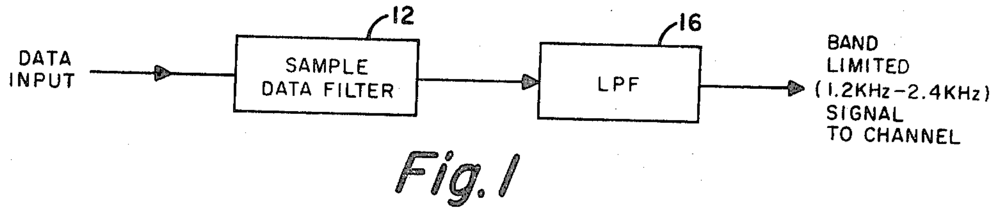
FIG. 1 is a block diagram of a data transmission system which incorporates the invention.
Figure 3:
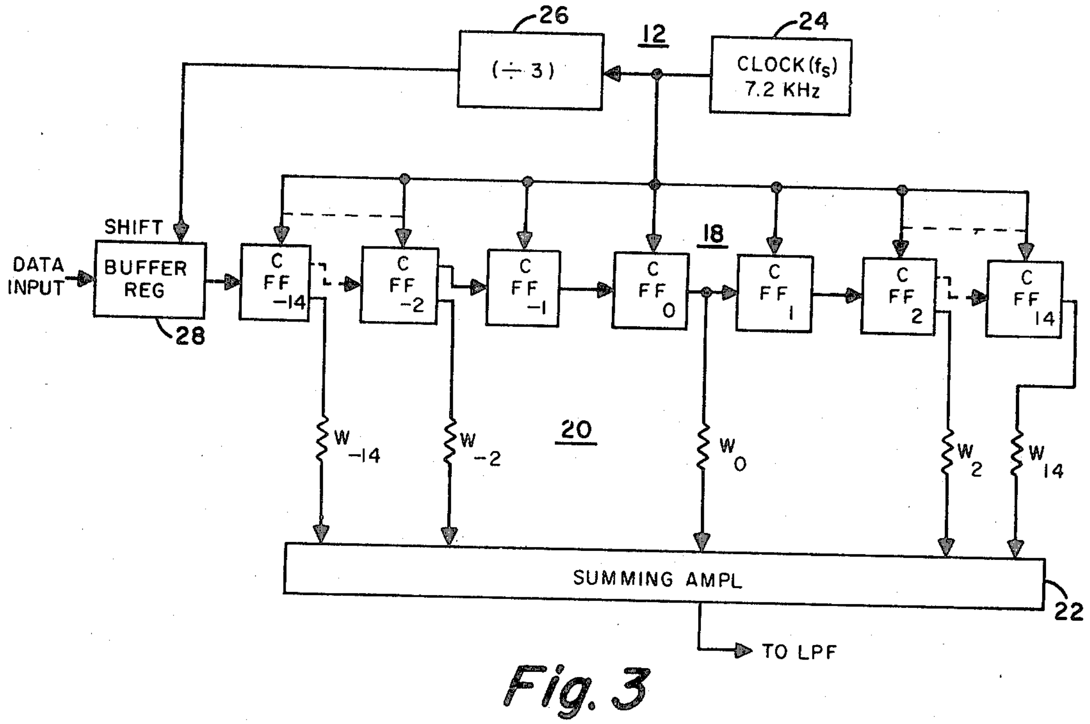
FIG. 3 is a more detailed block diagram of the sample data filter shown in FIG. 1.
Figure 4:
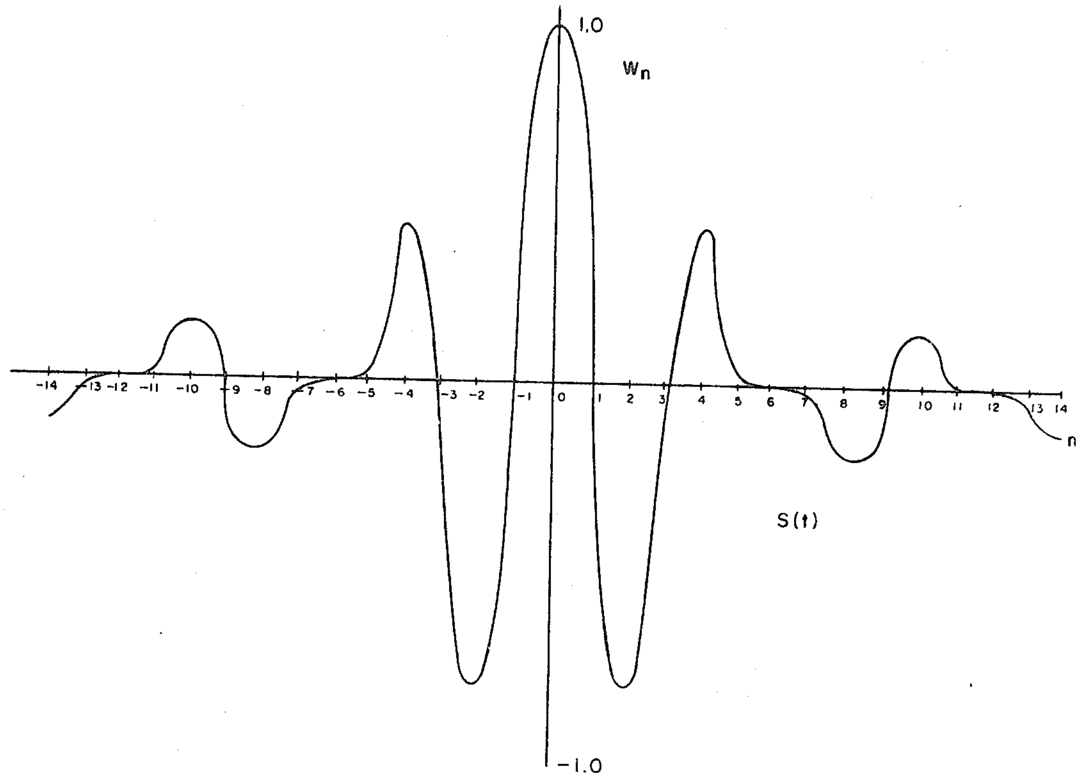
Figure 5:
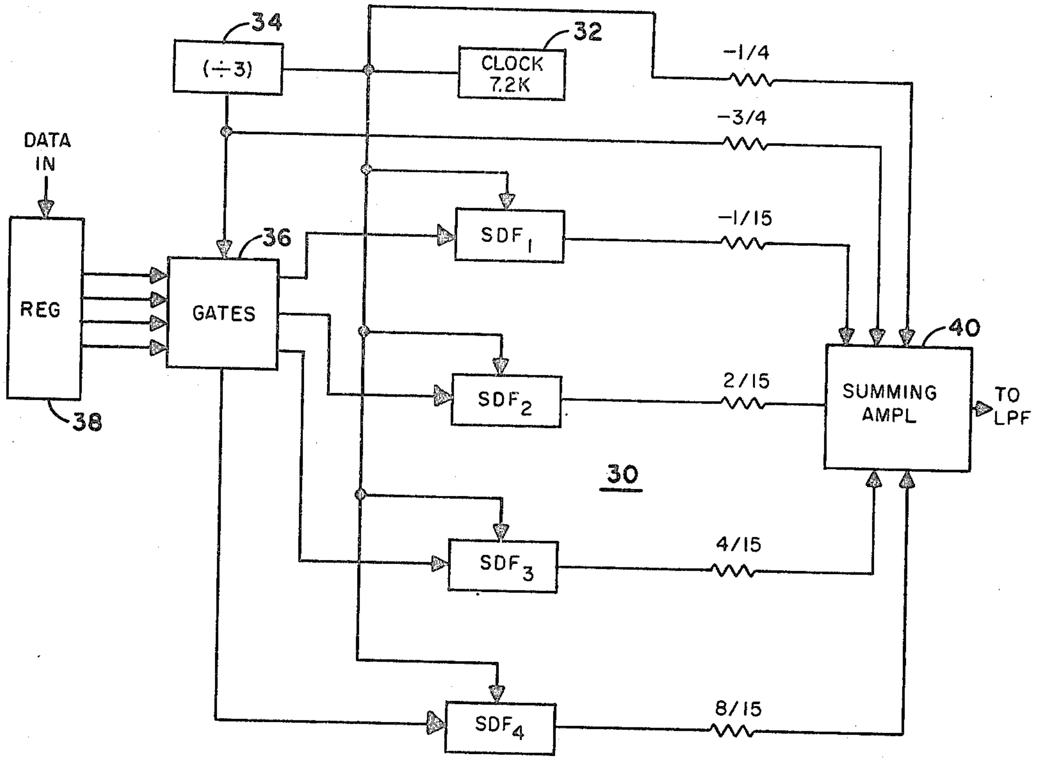

FIG. 4 is a curve showing the impulse response of the output signal from the system shown in FIG. 1 which also indicates the derivation of the weight accorded to each of the samples which are obtained during the operation of the sample data filter shown in FIG. 3; and FIG. 5 is a block diagram of a system incorporating sample data filters of the type shown in FIG. 3 for providing a multilevel output signal for transmitting data at high rates.

Figure 2:
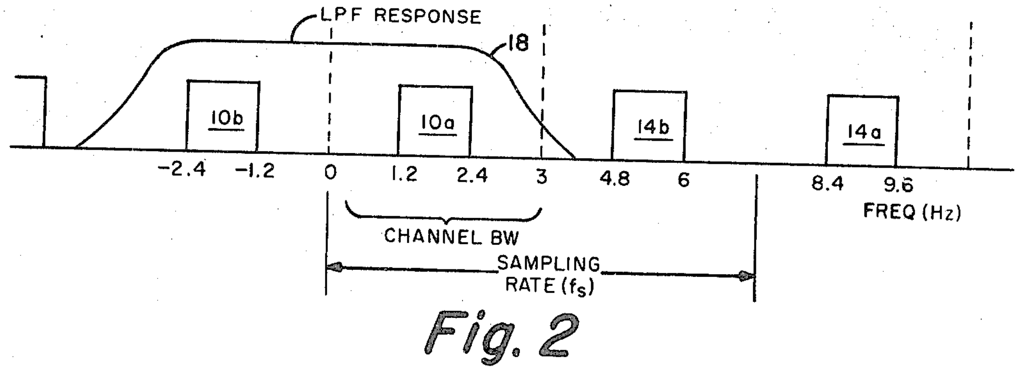
FIG. 2 is a curve showing the response characteristics of the sample data filter shown in FIG. 1.

Referring more particularly to the drawings, FIG. 1 shows in generalized form a system embodying the invention which is adapted to provide a signal for transmitting digital data over a band-limited channel, such as a voice wire line telephone channel. FIG. 2, which represents the frequency response and spectral characteristics of the channel and the signals which are transmitted therethrough, indicates that the channel bandwidth which is available extends from about 300 Hz. to 3,000 Hz. It is desirable to confine the transmitted messages to a frequency region near the center of the channel bandwidth where the distortion interposed by the channel is low. For the wire line channel mentioned above, this frequency region is between 1.2 kHz. and 2.4 kHz. The system shown in FIG. 1 generates a band limited signal for transmission over this central portion of the channel bandwidth (viz a signal confined in the frequency panel 10*a* and 10*b* lying between ±1.2 kHz. to 2.4 kHz.). It will be appreciated that the negative frequency region is in existence and is shown to satisfy the mathematical relationships involved in defining channel bandwidth characteristics.

The sample data filter 12 (FIG. 1) allows a nondistorted signal to be generated representing the data input. By eliminating the distortion, the spectrum of the signal is shaped so as to lie in the desired panels 10*a* and 10*b*. Such distortion as may be introduced by the channel itself may require compensation, such as delay equalization, at the receiving end of the system. Substantially no compensation is, however, required because of distortion in the transmitting system itself.

The data input to the system is in the form of a stream of data bits. The output signal to the channel will be a repetitive signal similar to the data input. However, in order to operate at high data input rates, say for example, 9,600 bits per second (B/s), a plurality of bits in the data input stream are transmitted together as a single symbol. Thus, the symbol rate will be lower than the actual incoming bit rate under the circumstances where high bit rates are to be handled. The symbol rate is dictated by the channel characteristics and the Nyquist criteria (see H. Nyquist, "Certain Topics in Telegraph Transmission," Transactions of the AIEE, Vol. 47, 1928). Nyquist has shown that the symbol rate through an ideal channel can be twice the channel bandwidth. Thus, given a channel bandwidth of 1.2 kHz. as represented by the panel 10*a*, the symbol rate is desirably 2,400 symbols per second.

The sample data filter processes the data input using digital technique in order to provide the spectral response represented by the panels 10*a* and 10*b*. Briefly, the sample data filter tailors or shapes the data so that its spectral response characteristics are those desired. In other words, the data input is digitally filtered.

The filtering action may be appreciated from the following qualitative analysis. Assume that all the bits of the message to be transmitted presented themselves repeatedly at a given rate. At each instant, each bit of the message is available to make its contribution to an overall output signal. The spectrum of that signal will depend upon the contribution made by each bit. This contribution may also be thought of as a sample of each bit of the message. By adjusting the value of each sample, the amplitude-time relationship which is desired may be obtained. The requisite values correspond to the weight accorded to each sample to provide the desired filter response. The filter will have a linear phase characteristic inasmuch as the same weights are allocated to the sample in the same time relation at each sampling instant (viz $s(t)=s(-t)$). The digital values which are sampled at each sampling instant are also assumed to be constant, thereby avoiding any transient phenomenon which could distort the phase characteristic of the filter.

The sampling rate must be commensurate with the symbol rate. In the instant case, the symbol rate is 2,400 symbols per second. Thus, the sampling rate must be higher. Inasmuch as the signal which is generated by the filter will be effectively modulated by the sampling signal, a duplicate response will result at a frequency centered with respect to the sampling rate frequency. This duplicate response is represented by the panels 14*a* and 14*b*. Given a sampling rate ($f_s$) of 7.2 kHz., the duplicate response will extend from 4.8 kHz. to 9.6 kHz. This duplicate response is suppressed by a low pass filter 16 of conventional design. Additional duplicate responses which occur at higher multiples of the sampling rate are similarly suppressed. The low pass filter response characteristic 18 is shown in FIG. 2. The sampling rate may, of course, be higher, say 9.6 kHz. The low pass filter response characteristic may then even be less critical than shown in FIG. 2. Of course, the low pass filter will operate over its linear phase characteristic in the 1.2 kHz. to 2.4 kHz. region in which the spectrum of the output signal which is transmitted over the channel lies.

The sample data filter 12 has three basic parts which are a digital shift register 18 having sufficient flip-flop stages which can provide the samples from which the desired spectral response can be structured. The second part is a weighting network 20 made up of a plurality of resistors, one for each flip-flop output to which a weight is assigned. The third part of the filter is a summing network which may be in the form of a summing amplifier 22 to which the weighting resistors are connected. The sampling signal is provided by means of a clock 24 which produces output pulses at the desired sampling rate $f_s$. This rate in this illustrative example is 7.2 kHz. The clock is also divided by three in a divide-by-3 counter circuit 26 which shifts out the data at the rate of 2,400 B/s from a buffer register 28 in which the data may be stored upon its arrival from a data input source. The clock is connected to the clock inputs of the flip-flops which make up the register. Thus, on each 2,400 Hz. pulse, a new bit will be presented to the first flip-flop stage $FF_{-14}$ viz on every third sampling pulse). The data bits are shifted along at three times the input rate, so that three successive flip-flops in the chain will store the same value bit as the message passes through the chain. Twenty-nine flip-flops are used in the register 18; these are labeled $FF_{-14}$ to $FF_0$ to $FF_{14}$. These flip-flops provide sample outputs which are weighted in the resistors connected thereto in order to structure the required spectral response characteristic. The samples which are produced by some of the flip-flops are necessarily zero amplitude, as will be explained more fully hereinafter (e.g., the outputs of $FF_{-1}$ and $FF_1$). Accordingly, no resistors are connected between the outputs of these flip-flops and the summing amplifier 22.

The filter response is dictated by its impulse response $s(t)$. The desired impulse response is generated by providing the desired sample values. The sampling points are provided at the different time positions along the impulse response by means of the flip-flops in the register 18 which produce these values at each of these time positions. Each sample value will be generated at a different time NT/3. A different value N is generated every T/3 or 1/7,200 seconds in the illustrated filter 12 by virtue of the fact that the symbol rate is 2,400 Hz. By virtue of the sampling rate, which is three times the symbol rate, three sample values are presented for each symbol. The desired impulse response therefore gives the information necessary for assigning the weights to the samples. The impulse response of a filter which has the spectral characteristics represented by the panels 10*a* and 10*b* in FIG. 2 is shown in FIG. 4. The sampling points N are enumerated on the abscissa of the curve. Only 14 sampling points on either side of the origin are shown or used, inasmuch as the values of the samples (the value of the impulse response) become negligible (less than 10 percent of full scale) after the 14th sampling point. It will be observed that the value of the impulse response is zero at certain sampling points (e.g., $N=1$, $N=-1$, $N=3$, $N=-3$). Accordingly, these sample values are accorded zero weight. The other sample values may be scaled from the impulse response curve of FIG. 1. Thus, the resistor $w_o$ which provides the center sample value may be 1,000 ohms. The negative sample may be obtained by using the (−) or inverting input to the summing amplifier 22 and the positive sample may be obtained by using the (+) or direct input to the summing amplifier 22, which may be an operational amplifier. The resistors may have correspondingly higher values in order that the voltage presented to the summing amplifier will be the proper fraction of the full scale voltage at the central or $N=0$ sampling point. Thus, suitable value for the resistors $w_2$ and $w_{-2}$ may be 1,250 ohms approximately. In the event that a somewhat different filter response is desired, say with a symmetric rolloff at about 1.2 and 2.4 KHz., in order to accommodate the distortion characteristics of the channel, the impulse response may be modified accordingly. The weighting resistors in the network 20 will then have somewhat different values to accommodate the different filter response characteristics.

The impulse response of the sample data filter 12 may be mathematically expressed as follows:

$$s(t)=\frac{\sin \omega_1 t}{\omega_1 t}\left[\frac{\cos r\omega_1 t}{1-\frac{(2r\omega_1 t)^2}{\pi}}\right]\cos \omega_0 t$$

In this equation $w_1$ is related to half the desired bandwidth (viz $f_1=\frac{1}{2}(2,400-1,200)$ or 600 Hz. $W_o$ is equal to $ZW_1$ where Z is an odd integer. This instance Z is equal to 3 allowing the signal spectrum to be contained in the channel pass band (viz 1,200–2,400 Hz.). $r$ determines the rolloff characteristics on the skirts of the band-pass characteristic of the filter. For the perfectly square characteristic (viz infinite cutoff), $r$ is equal to zero. The values of the weights correspond to the value of $s(t)$ at each of the sampling times (viz at $t=1/7,200$ seconds). The following table provides typical values for different rolloff characteristics

| N | r=0 | r=0.5 | r=1.0 |
|---|---|---|---|
| −14 | −.11814 | −.02302 | .00284 |
| −13 | .0 | .0 | .0 |

| N | $r$=0 | $r$=0.5 | $r$=1.0 |
|---|---|---|---|
| −12 | .0 | .0 | .0 |
| −11 | .0 | .0 | .0 |
| −10 | .16540 | .08057 | −.00817 |
| −9 | .0 | .0 | .0 |
| 8 | −.20674 | −.13290 | −.01691 |
| 7 | .0 | .0 | .0 |
| 6 | .0 | .0 | .0 |
| 5 | .0 | .0 | .0 |
| 4 | .41350 | .37215 | .26582 |
| 3 | .0 | .0 | .0 |
| 2 | −.82699 | −.80572 | −.74429 |
| 1 | .0 | .0 | .0 |
| 0 | 1.0 | 1.0 | 1.0 |
| 1 | .0 | .0 | .0 |
| 2 | −.82699 | −.80572 | −.74429 |
| 3 | .0 | .0 | .0 |
| 4 | .41350 | .37215 | .26582 |
| 5 | .0 | .0 | .0 |
| 6 | .0 | .0 | .0 |
| 7 | .0 | .0 | .0 |
| 8 | −.20674 | −.13290 | −.01691 |
| 9 | .0 | .0 | .0 |
| 10 | .16540 | .08057 | −.00817 |
| 11 | .0 | .0 | .0 |
| 12 | .0 | .0 | .0 |
| 13 | .0 | .0 | .0 |
| 14 | −.11814 | −.02302 | .00284 |

It will be apparent therefore, that the sample data filter shapes the density of the spectrum of the output signal, so as to provide the desired spectral characteristic. The symbols are produced at the 2,400 Hz. rate without introducing inter symbol interference distortion (viz $s(t)=1$ at $t=0$, $s(t)=0$ at $t=K/2{,}400$ for all $K$ except $K=0$).

In order to transmit the data at effectively higher bit rates, it becomes necessary to transmit a multilevel output signal where each symbol represents a plurality of bits. Assuming that a transmission rate of 9,600 bits per second is desired, each symbol may be generated so as to represent a sequence of four bits. A multilevel sample data filter 30 is shown in FIG. 5. This multilevel filter includes four sample data filters $SDF_1$ through $SDF_4$ each of which is similar to the filter 12 shown in FIG. 3. The sampling rate is, however, determined by a common clock 32 and data is inputed to the filters at a rate of 2,400 Hz. by means of the gating signals generated by the divide-by-3 counter 34 which enables transfer gates 36 to apply the last four bits in a buffer register 38 to the inputs of the sample data filters $SDF_1$ to $SDF_4$, respectively. The data may be inputed to the buffer register 38 at a rate of 9,600 B/s, inasmuch as four bits are read out simultaneously via the transfer gate 36 at the 2,400 Hz. rate. In order to accommodate the four bits, 16 symbol levels are needed (each symbol carries four bits of information). The output of the filters $SDF_1$ to $SDF_4$ are respectively multiplied by binarilly related factors 1/15, 2/15, 4/15 and 8/15 prior to being added in a final summing amplifier 40. While resistors are shown as providing these binarilly related multiplication factors, amplifiers which have the binarilly related gain characteristics may be used. In order that the symbol representing a binary input of 0000 have a relative value of −15, it is necessary to provide a bias occurring at the proper time positions of the sample values which will maintain the same impulse response, and therefore the same spectral characteristic of the overall filter. This is accomplished by multiplying the output of the divide-by-3 counter 34 by ¾ and the output of the clock oscillator 32 by ¼ and adding the quantities together with the outputs of the sample data filters in the summing amplifier 40. The inverting input of the amplifier 40 may be used to obtain these negative values. In other words, at each of the sample times (each 1/7,200 second), the requisite sample value is multiplied by a factor (A) having a value which is related to the binary input in accordance with the following table:

| Binary Input | Max. Symbol Level Output |
|---|---|
| 1111 | 15 |
| 0111 | 13 |
| 1011 | 11 |
| 0011 | 9 |
| 1101 | 7 |
| 0101 | 5 |
| 1001 | 3 |
| 0001 | 1 |
| 1110 | −1 |
| 0110 | −3 |
| 1010 | −5 |
| 0010 | −7 |
| 1100 | −9 |
| 0100 | −11 |
| 1000 | −13 |
| 0000 | −15 |

In this manner, the 16 symbol levels will be generated and the impulse response will be the same as provided by a single sample data filter and therefore will conform to the desired spectral response characteristic.

From the foregoing description, it will be apparent that there has been provided an improved system and method for transmitting digital information. While exemplary forms of the system have been illustrated, both for the transmission of single level and multi level representing symbols, it will be appreciated that variations and modifications of the herein described system and method will undoubtedly suggest themselves to those skilled in the art. For example, different bit storage techniques than the shift register may conceivably be used in practicing the invention which will nevertheless provide the digital delays necessary to generate the samples at the desired sampling times. Accordingly, the foregoing description should be taken merely as illustrative and not in any limiting sense.

What is claimed is:

1. Apparatus for simultaneously transmitting a group of bits of digital data in the form of a bipolar analog signal comprising a. plurality of sample data filters, b. means for applying different bits of successive groups of bits of said data to different ones of said filters at a first rate, c. means for shifting said bits through said filters at a second rate which is a multiple of said first rate, d. means for providing weighted bias pulses at said first rate and at said second rate, e. means for combining the outputs of all of said filters in weighted relationship with each other together with said bias pulses to provide an output signal, and f. means for transmitting a band limited portion of said output signal.

2. The invention as set forth in claim 1 wherein each of said sample data filters includes a shift register, a weighting network connected to the stages of said register and a summing circuit input connected to said register to provide a filter output signal.

3. The invention as set forth in claim 2 wherein said applying means includes a buffer register adapted to be continuously filled with the bits of said data, gating means for repetitively transferring bits stored in successive stages of said buffer register each to the input of a different one of said shift registers, and means for shifting said bits through said shift registers.

4. The invention as set forth in claim 3 wherein said combining means includes means coupled to each of said summing circuits for deriving outputs having amplitudes which are binarilly related corresponding to the order of the bits in said buffer register which is connected to the input of the one of said shift registers associated with said summing circuit, and an output summing circuit for combining the outputs of each of said filter summing circuits.

5. The invention as set forth in claim 4 wherein said bias pulses at said second rate have a level which is greater than the maximum sum of said filter summing circuit output levels.

* * * * *